(12) United States Patent　　(10) Patent No.: US 11,456,921 B2
Prendergast et al.　　(45) Date of Patent: Sep. 27, 2022

(54) SELF-CONTAINED MICROSERVICE PLATFORM

(71) Applicant: NCR Corporation, Atlanta, GA (US)

(72) Inventors: William Michael Prendergast, Winter Springs, FL (US); Michael Schechter, Lake Mary, FL (US); Khaled Janania, II, Orange City, FL (US)

(73) Assignee: NCR Corporation, Atlanta, GA (US)

( * ) Notice: Subject to any disclaimer, the term of this patent is extended or adjusted under 35 U.S.C. 154(b) by 52 days.

(21) Appl. No.: 16/397,525

(22) Filed: Apr. 29, 2019

(65) Prior Publication Data

US 2020/0344123 A1　　Oct. 29, 2020

(51) Int. Cl.
| | |
|---|---|
| *H04L 41/0893* | (2022.01) |
| *H04L 41/5054* | (2022.01) |
| *G06F 9/455* | (2018.01) |
| *H04L 67/51* | (2022.01) |
| *H04L 61/4511* | (2022.01) |

(52) U.S. Cl.
CPC ...... *H04L 41/0893* (2013.01); *G06F 9/45558* (2013.01); *H04L 41/5054* (2013.01); *H04L 61/1511* (2013.01); *H04L 67/16* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 2007/0101132 A1* | 5/2007 | Cuellar | ............... | H04W 12/033 713/168 |
| 2009/0083406 A1* | 3/2009 | Harrington | ............. | G06F 15/16 709/222 |
| 2014/0053149 A1* | 2/2014 | Wu | ........................... | G06F 8/63 717/176 |

(Continued)

OTHER PUBLICATIONS

Droms, R. "RFC 2131: Dynamic Host Configuration Protocol", RFC-Editor.org, Mar. 31, 1997 [retrieved on Nov. 24, 2021]. Retrieved from the Internet: <URL: https://www.rfc-editor.org/rfc/pdfrfc/rfc2131.txt.pdf>. (Year: 1997).*

*Primary Examiner* — Kevin T Bates
*Assistant Examiner* — Dae Kim
(74) *Attorney, Agent, or Firm* — Schwegman, Lundberg & Woessner (57) ABSTRACT

A configuration interface is provided. Hardware settings are obtained for a target server's networked environment through the configuration interface. Microservices are selected with configuration settings through the configuration interface. An installation package is created having an Operating System (OS), the selected microservices, the hardware settings, and the configuration settings. The installation package is uploaded to a blade server. Upon detection by the blade server of the presence of the target server's networked environment, a bootstrap operation is processed and the OS with the selected microservices are loaded and initiated on the blade server. The microservices are provided over the target server's network as a self-contained microservice platform from the blade server. The microservices interact with transaction devices over the network and user-operated devices through a portal interface provided with the installation package.

8 Claims, 6 Drawing Sheets

(56) References Cited

U.S. PATENT DOCUMENTS

| | | | | |
|---|---|---|---|---|
| 2016/0232624 A1* | 8/2016 | Goldberg | ............... | G06Q 30/02 |
| 2018/0302283 A1* | 10/2018 | Vyas | ................... | G06F 9/45558 |
| 2018/0349033 A1* | 12/2018 | Kapadia | .............. | G06F 9/45558 |
| 2019/0004871 A1* | 1/2019 | Sukhomlinov | ......... | G06F 9/541 |
| 2019/0028352 A1* | 1/2019 | Rao | ........................ | H04L 12/44 |
| 2019/0102717 A1* | 4/2019 | Wu | ................. | G06Q 10/06375 |
| 2019/0238636 A1* | 8/2019 | Li | ....................... | H04L 67/1095 |
| 2020/0065085 A1* | 2/2020 | Talbert | .................... | H04L 67/34 |
| 2020/0192690 A1* | 6/2020 | Gupta | ................... | G06F 9/4418 |
| 2020/0250083 A1* | 8/2020 | Shilane | ................ | G06F 3/0641 |
| 2020/0310830 A1* | 10/2020 | Morgan | ................. | G06F 9/441 |

\* cited by examiner

SELF-CONTAINED MICROSERVICE PLATFORM

BACKGROUND

Today, most electronic services are delivered via cloud environments. It seems nearly every enterprise has outsourced their development and data to third-party providers. This benefits an organization because specialized technical staff is not needed nor is specialized hardware; rather, the organization can rely on the expertise of a third party. In fact, there are many benefits to outsourcing electronic services.

However, one major drawback to cloud environments is security and lack of control by the organization. Data assets are confidential and vital to the competitiveness of the organization. When services and data assets are outsourced, the organization gives up control and learns to live with the inevitability that their services and assets may be compromised, since they reside in the cloud and are accessible over any Internet-based connection to potential hackers.

Additionally, governmental agencies have enacted a plethora of regulations regarding data privacy and security that each organization must now adhere to. When the organization outsources management of its data assets, compliancy to these regulations is dependent on the third-party cloud provider's security and audit procedures.

As a result, many organizations would like to migrate off the cloud-based environments into their own self-contained networked environments where they have and are directly responsible for their own security and audit compliance. However, these organizations lack the expertise and resources to custom develop and maintain their needed electronic services and manage their own data asset; organizations have become dependent on their third-party service provider's products.

Essentially, organizations want to have the benefits of third-party services they have become accustomed to, want to be able to customize these services based on their own needs, and want to be able to control access to these customized services within their own firewalled environment.

SUMMARY

In various embodiments, methods and a device for self-contained microservice platforms are presented.

According to an embodiment, a method for configuring and providing a self-contained microservice platform is presented. Hardware settings are obtained for a target server. Selections of microservices and configuration settings for each selection are identified. An installation package is created having the microservices that correspond to the selections, the configuration settings, and the hardware settings. The installation package is uploaded onto a blade server for installation on the target server as self-contained microservice platform.

DETAILED DESCRIPTION

Figure 1:
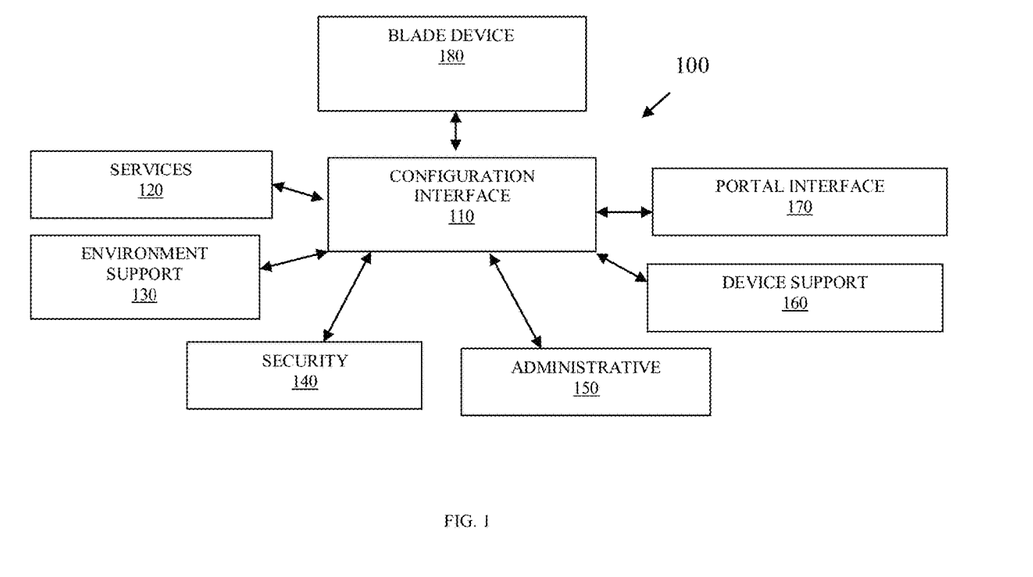
FIG. 1 is a diagram of an architecture for a customized and self-contained microservice platform, according to an example embodiment.

FIG. 1 is a diagram of an architecture 100 for creating and providing a customized and self-contained microservice platform, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of a customized and self-contained microservice platform, presented herein and below.

As used herein and below, the terms "customer," "consumer," "operator," "administrator," and "user" may be used interchangeably and synonymously.

The architecture 100 includes a configuration interface 110, a plurality of electronic services 120, processing environment support 130, security services 140, an administrative interface 150, device support 160, a portal interface 170, and a self-contained blade device 180.

The configuration interface 100 include executable instructions that reside on a non-transitory computer-readable storage medium and that are executed on one or more hardware processors of a computing device (server, desktop, etc.).

The components 120-170 are executable instructions and/or source code data and configuration files that are selectable and customizable by the configuration interface 110 from storage accessible to the configuration interface 100.

The blade device 180 includes hardware processors, memory (volatile and non-volatile), storage, network interfaces (gateway, router, etc.), communication ports, and a Basic Input/Output System (BIOS). The blade device 180 is designed to physical fit and be inserted into a blade port of a server.

As used herein, a "self-contained processing environment" is intended to include at least one an operating system (OS) and executable instructions representing customizations of the components 120-170, which are installed on the blade device 180. The self-contained processing environment performs all processing within and on the blade device 180 when installed and initiated on the blade device 180. The components 120-170 of the self-contained processing environment logically cooperate to from a processing environment or platform. In an embodiment, the self-contained processing environment is a Virtual Machine (VM). In an embodiment, the self-contained processing environment is a container.

As used herein, the term "platform" may be used synonymously and interchangeably with the phrase "processing environment."

As used herein, the term "service" may be used synonymously and interchangeably with the term "microservice."

A single blade device 180 may include one or multiple self-contained processing environments installed and executing thereon.

The architecture 100 configures a blade device 180 with one or more custom-defined self-contained processing environments via the configuration interface 110 utilizing the resources 120-170.

A target hardware server is identified and hardware configuration settings are obtained for the target server. The configuration interface 110 is used to define the hardware configuration settings of the target service utilizing the environment support 130. The Internet Protocol (IP) address and Domain Name System (DNS) for the blade device 180 are parameterized within the configuration settings and can be automatically populated within the hardware configuration settings upon installation of the blade device 180 on the target server. This allows the blade device 180 to be recognized and accessed over a network associated with the target server when the blade device 180 is inserted into a blade slot of the target server and booted up for access over the target server's network.

Similarly, the configuration interface 110 defines the OS and its settings via the environment support 130. Network interfaces and protocols used by the self-contained processing environment are also defined by the configuration interface utilizing the environment support 130.

Furthermore, high-availability, replication, and backup settings for the self-contained processing environment are defined using the environment support. This may entail identifying a separate and independent blade device 180 that is utilized for backup, replication, fail-over support, and high-availability of the initial configured blade device 180. A configuration setting for the environment support can identify if a blade device 180 being configured is to be a primary or backup for the self-contained processing environment. Furthermore, the type of backup and replication desired can be defined within the environment support. All the necessary executable instructions for performing the high-availability, replication, backup, and failover support are identified from the environment support based on selections made within the configuration interface for the configuration settings of the environment support 130.

Services 120 are selected for the self-contained processing environment via interface 120. Any customization of resource settings can be made via the configuration interface for each selected service. In some instances, a particular service may be deactivated and automatically activated once installed on the blade device 180 when an appropriate license for that service is discovered within the self-contained processing environment. In this way, services may be pre-installed but are inactive and automatically become active when a service manager service discovers a valid license within the self-contained processing environment. This ensures that services are available when needed by a customer without requiring any network download and install by the self-contained processing environment. Each service may also include settings that allow the service manager service to automatically download and installed updates and patches to source code associated with an installed service.

Security services 140 and settings are selected via interface 120. Security services 140 can include certificates for the services 120, a certificate authority, authentication mechanisms for users and an administrator, access rights to services based on assigned security roles, password verification, check sum validation, and the like.

Administrative services 150 and settings are selected via interface 120. Administrative services 150 can include user administration services, device administration services, processing logs, audit trails, changing security roles, changing authentication mechanisms, and the like.

Device support services 160 and settings are selected via interface 120. Device support services 160 can include types of devices being managed by the self-contained processing environment and related device settings and logs, such as mobile device types, Point-Of-Sale (POS) terminal types, network-based scanners, network-based printers, Self-Service Terminal (SST) types, and the like. The device support 160 may include appropriate device drivers and protocols to communicate directly with the devices over a network once the blade device 180 is installed in the target server.

Portal interface 170 includes a network-based interface that is exposed over the network when the blade device 180 is installed in the target server. The portal interface 170 provides an interface for accessing the installed services 120, environment support 130, security 140, administrative interfaces 150, and device support 160 over the network when the blade device 180 is installed on the target server. The portal interface 170 is associated with the assigned target server's IP address for the blade device 180 and the DNS name accessible over the target server's network. A preconfigured name may be provided for accessing the portal interface 170, which is then mapped to the assigned IP address and DNS name, such that the portal interface 170 can be accessed with a known name or label by network devices utilizing and/or being managed by the self-contained processing environment.

Once the configuration interface 110 has obtained all the configuration settings for 120-170, the source code for the selected services, an environmental service manager, high-availability service manager, administrative manager, security manager, device support manager, and portal interface manager are obtained in accordance with the selected settings. A build operation is selected within the configuration interface 110 and the source code with settings (including the OS defined in the environment support settings 130) is packaged within an installation executable package. A commit operation is selected within the configuration interface 110 to upload the installation executable package onto the blade device 180. At this point, the self-contained processing environment is ready to be loaded and initiated on the hardware of the blade device 180.

The blade device 180 includes a BIOS that executes when the blade device is booted (control sequence) and/or powered on. The BIOS on first boot will execute the installation executable package.

The blade device 180 is installed on the target server and boots up with the BIOS causing the installation executable package to execute, which loads the self-contained processing environment and executes all the services on the installed OS.

In some cases, multiple independent self-contained processing environments with a same OS or a different OS may be initiated based on multiple installation packages or particular settings in the BIOS, these multiple independent self-contained processing environments may be VMs and/or containers, or a combination of VMs and containers. For instance, one VM may be a production environment with a second VM being a test environment. Or, a separate container may be used for administrative actions that is separate from a production container. The underlying data storage may provide a mechanism by which different independent self-contained processing environments can share the same data and provider intercommunication between different instances of the services across the different self-contained processing environments on the blade device 180.

Figure 2:
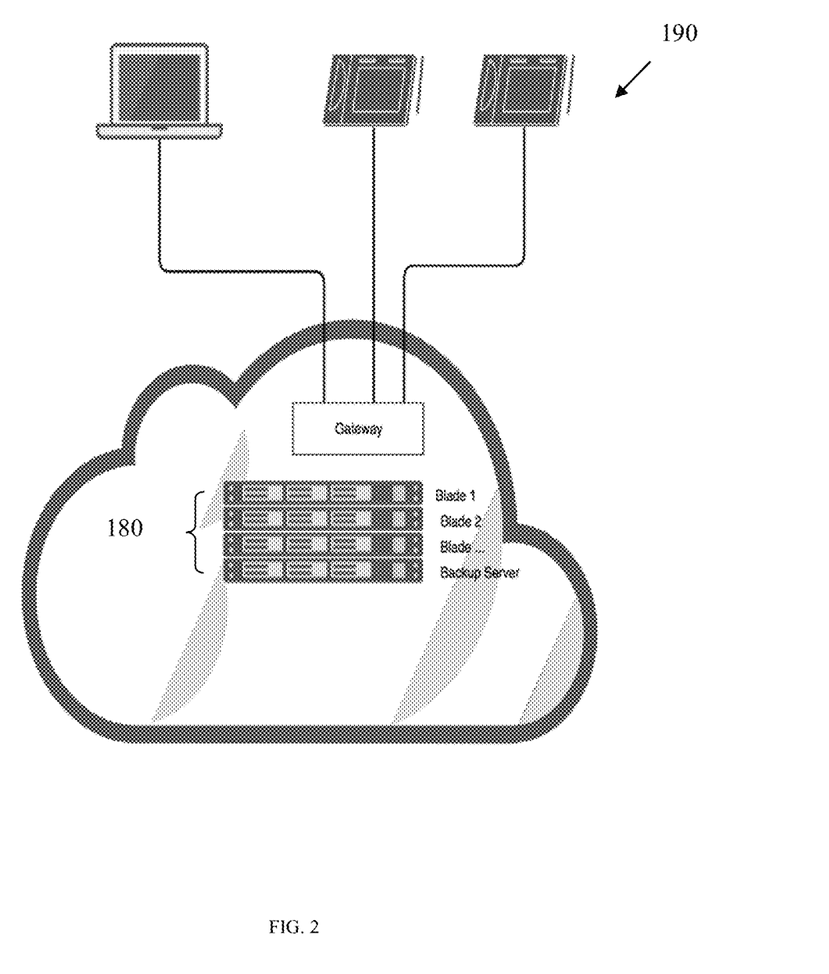
FIG. 2 is a diagram of a system having a customized and self-contained microservice platform, according to an example embodiment.

FIG. 2 is a diagram of a system 190 having a customized and self-contained microservice platform, according to an example embodiment.

The system 190 illustrates a plurality of blade devices 180 installed on a target server. Each blade 180 representing single or multiple independent customized and self-contained processing environments as discussed above. One particular blade 180 (labeled Backup Server in the FIG. 2), may provide a backup and/or replication to the other blades 180 or a particular one of the other blades 180.

This system 190 shows access from a plurality of devices over a target server's network through a gateway (router).

Figure 3:
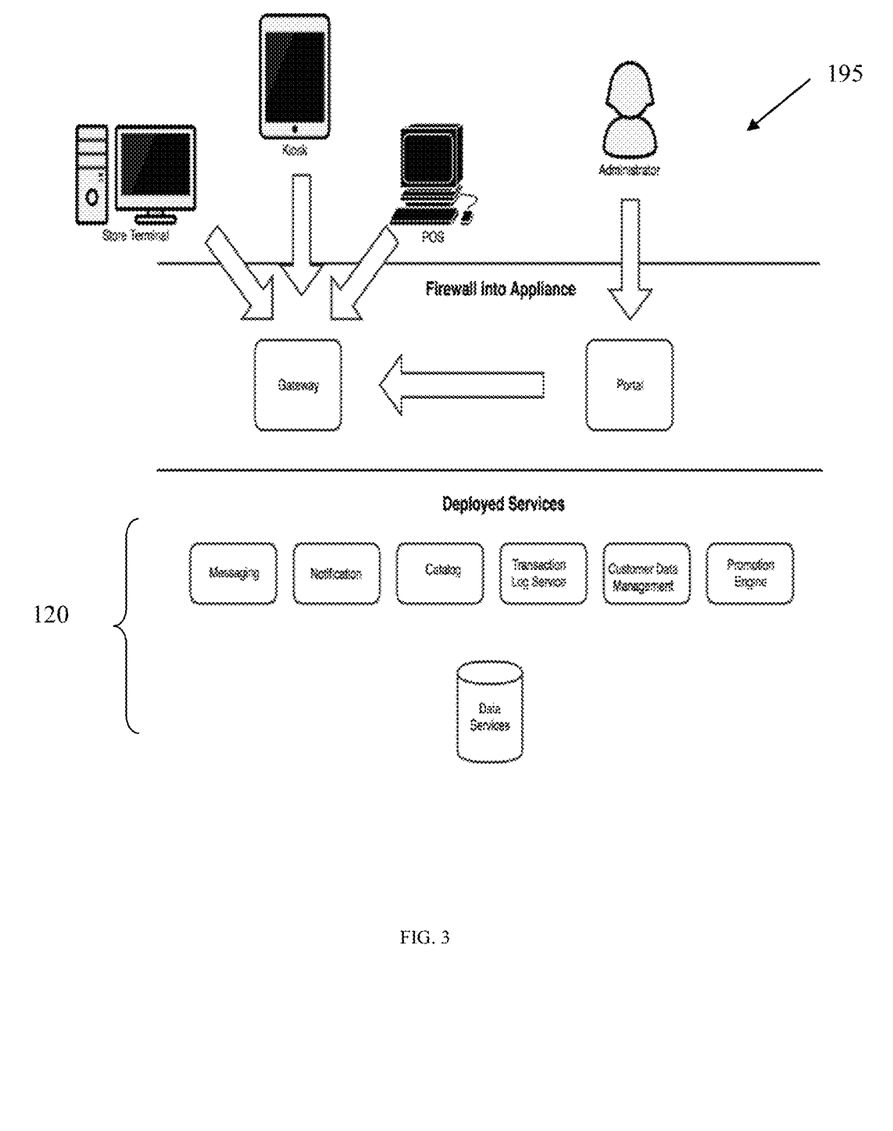
FIG. 3 is a diagram presenting another view of the system having the customized and self-contained microservice platform, according to an example embodiment.

FIG. 3 is a diagram presenting another view of the system 195 having the customized and self-contained microservice platform, according to an example embodiment. The system 195 shows a variety of connected devices to the blade 180 over a target server's network through a gateway. Such illustrated devices include, a store desktop terminal, a kiosk or SST, a POS terminal, and a mobile device operated by an administrator. The administrator accesses the self-contained processing environment of the blade 180 through the portal interface whereas agents on the store desktop, kiosk, and POS terminal access directly through the gateway connection.

The FIG. 3 also illustrates a variety of custom-configured services that are executed on the blade 180 within the self-contained processing environment, such as messaging services, notification services, product catalogs, transaction log services, customer data management, promotion engines, and data services.

In an embodiment, the self-contained processing environment is a retail business that sells goods and services to customers within a store. The entire enterprise operation is encapsulated on the blade 180 as a self-contained processing environment. The self-contained processing environment is deployed within a firewalled environment of the retailer's servers. That is, no cloud-based access is needed and all retail operations are contained within its firewalled environment through the blade 180. The installed services may still have access to an Internet-based connection outside of the firewall environment but all such communication is controlled exclusively by the services and such is not necessary for operating the enterprise services. The internet-based connection access may be limited to receiving update notifications when services of the self-contained processing environment require an update, upgrade, and/or patch. Such connections are preconfigured within the management services of the self-contained processing environment.

All processing enterprise services are encapsulated, walled off, isolated and controlled within the blade 180 and the self-contained processing environment. This gives control over access to the services and the data assets of an enterprise to the firewalled environment of the enterprise and eliminates any need for cloud-based services.

The services 120 process within the context of the self-contained processing environment on the hardware associated with the blade device 180. The portal interface 170 provides a mechanism by which access can be obtained to a variety of the services 120 by users/administrators. In an embodiment, the portal interface 120 is a web-based browser interface. Additionally, the devices (SSTs, POS terminals, desktops, and mobile devices) may include agents that directly communicate with some of the services 120, such as delivering logs, events, and other data in real time or periodically to a number of the services 120.

In an embodiment, the SST includes a self-checkout grocery store station, a kiosk, and/or an Automated Teller Machine (ATM).

These and other embodiments are now discussed with reference to the FIGS. 4-6.

Figure 4:
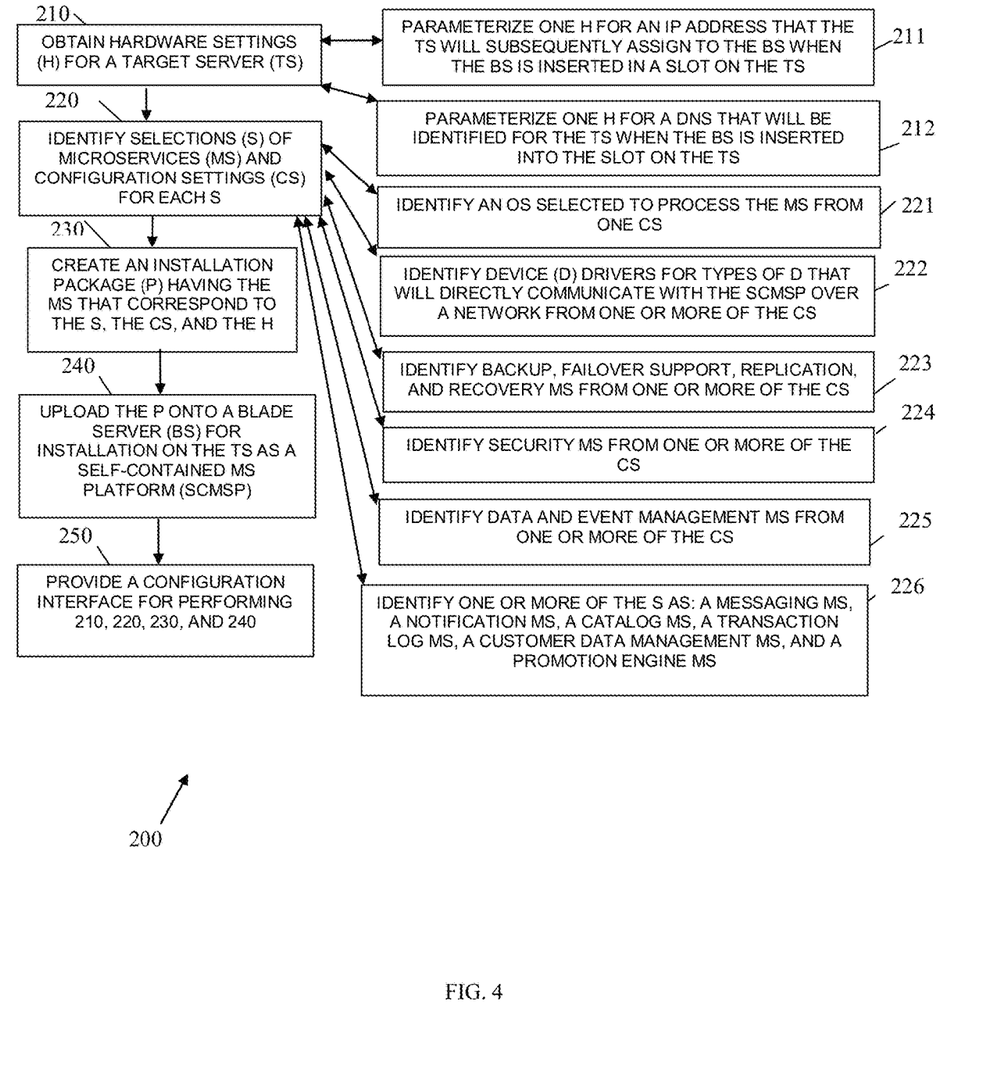
FIG. 4 is a diagram of a method for configuring and installing a customized and self-contained microservice platform, according to an example embodiment.

FIG. 4 is a diagram of a method 200 for configuring and installing a self-contained microservice platform, according to an example embodiment. The software module(s) that implements the method 200 is referred to as a "self-contained processing environment creator." The transaction terminal processing environment creator is implemented as executable instructions programmed and residing within memory and/or a non-transitory computer-readable (processor-readable) storage medium and executed by one or more processors of a device. The processor(s) of the device that executes the self-contained processing environment creator are specifically configured and programmed to process the self-contained processing environment creator. The self-contained processing environment creator has access to one or more network connections during its processing. The network connections can be wired, wireless, or a combination of wired and wireless.

In an embodiment, the device that executes the self-contained processing environment creator is a server. In an embodiment, the server is the blade device/server 180.

In an embodiment, the self-contained processing environment creator interacts with the source and configuration sessions associated with a plurality of microservices 120-170 of the architecture 100 for purposes of creating a customized instance of a self-contained processing environment for a target server. In an embodiment, the target server is a server having a slot for the blade device/server 180.

The self-contained processing environment does not process within a cloud processing environment and is specifically configured for a specific hardware device, such as a server and/or a blade server.

At 210, the self-contained processing environment creator obtains hardware settings for a target server and/or target servers networked environment.

In an embodiment, at 211, the self-contained processing environment creator parameterizes appropriate hardware settings for an IP address substitution that the target server will assign to a blade server when that blade server is inserted in a slot of the target server. This allows for automatic substitution of the actual IP address for the blade server when the blade server is operational as an independent server over the target server's networked environment.

In an embodiment, at 212, the self-contained processing environment creator parameterizes appropriate hardware settings for a DNS that will be identified for the target server or the target server's network environment when the blade server is inserted in a slot of the target server. This allows for name lookups within the domain of the target server to obtain the appropriate resource addresses when the blade is operation within the target server's networked environment.

At 220, the self-contained processing environment creator identifies selections of microservices and configuration settings for each selected microservice.

In an embodiment, at 221, the self-contained processing environment creator identifies an operating system (OS) selected to process the microservices from at least one of the configuration settings.

In an embodiment, at 222, the self-contained processing environment creator identifies device drivers for types of devices that will directly communicate with the self-contained microservice platform over the target server's network from one or more of the configuration settings.

In an embodiment, at 223, the self-contained processing environment creator identifies backup, failover support, replication, and recovery microservices from one or more of the configuration settings.

In an embodiment, at 224, the self-contained processing environment creator identifies security microservices from one or more of the configuration settings.

In an embodiment, at 225, the self-contained processing environment creator identify data and event management microservices from one or more of the configuration settings.

In an embodiment, at 226, the self-contained processing environment creator identifies one or more of the selected microservices as: a messaging microservice, a notification microservice, a product catalog microservice, a transaction log microservice, a customer data management microservice, and a promotion engine microservice.

At 230, the self-contained processing environment creator creates an installation package having the microservices that correspond to the selections, the configuration settings, and the hardware settings.

At 240, the self-contained processing environment creator uploads the installation package onto the blade server for installation on the target server or within the target server's networked environment as a self-contained microservice platform.

In an embodiment, at 250, the self-contained processing environment creator is provided as a configuration interface for performing the processing 210-240. An administrator interacts with the configuration interface (self-contained processing environment creator) for creating and porting the self-contained microservice platform onto the blade server.

In an embodiment, the installation package when loaded into memory and initiated on the blade server represents a VM or a container.

In an embodiment, the self-contained processing environment creator may create multiple different and independent installation packages for the single blade server, each different installation package representing an independent self-contained microservice platform as a VM or a container. So, the blade server can include multiple VMs and/or containers, or a combination of VMs and containers.

Figure 5:
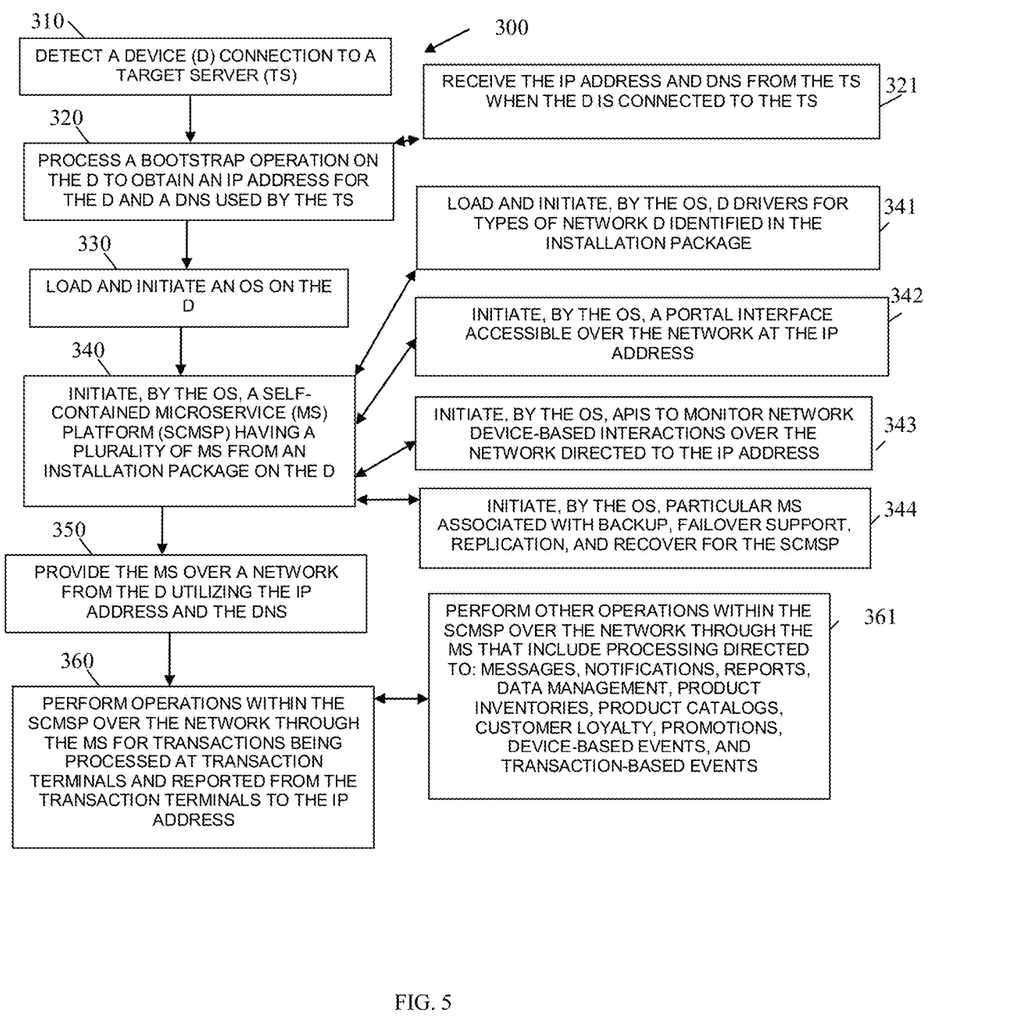
FIG. 5 is a diagram of a method of operating a customized and self-contained microservice platform, according to an example embodiment.

FIG. 5 is a diagram of a method 300 for operating a self-contained processing environment on a server over a network connection, according to an example embodiment. The software module(s) that implements the method 300 is referred to as a "self-contained processing environment." The self-contained processing environment is implemented as executable instructions programmed and residing within memory and/or a non-transitory computer-readable (processor-readable) storage medium and executed by one or more processors of a device. The processors that execute the self-contained processing environment are specifically configured and programmed to process the self-contained processing environment. The self-contained processing environment has access to one or more network connections during its processing. The network connections can be wired, wireless, or a combination of wired and wireless.

In an embodiment, the device that executes the self-contained processing environment is a server. In an embodiment, the server is the blade device/server 180 configured by and created by method 200 of the FIG. 4.

In an embodiment, the self-contained processing environment processes a plurality of customized microservices 120-170 for a retail establishment for purposes of providing an operating environment for transactions of the retail establishment.

In an embodiment, the self-contained processing environment interacts with a plurality of devices over a network connection. The devices include: SSTs, POS terminal, desktop computers, and mobile devices. The mobile devices include: phones, tablets, laptops, and wearable processing devices. The network connection can be wired, wireless, or a combination of both wired and wireless.

At 310, the self-contained processing environment detects a device connection to a target server or to a target server's network.

At 320, the self-contained processing environment processes a bootstrap operation on the device to obtain an IP address for the device from the network and a DNS used by the target server/network. This may be used to identifying configuration settings that have been parameterized within the installation package and substitute for those parameters the actual assigned IP address for the device and the actual DNS used by the network.

In an embodiment, at 321, the self-contained processing environment receives the IP address and DNS identification from the target terminal when the device is connected to the target server/network.

At 330, the self-contained processing environment loads and initiates an OS on the device.

At 340, the OS once initiated on the device, initiates a self-contained microservice platform having a plurality of microservices from an installation package on the device.

In an embodiment, at 341, the OS loads and initiates device drivers for types of network devices identified in the installation package.

In an embodiment, at 342, the OS initiates a portal interface accessible over the network at the IP address assigned to the device.

In an embodiment, at 343, the OS loads Application Programming Interfaces (APIs) to monitor network device-based interactions over the network directed to the IP address assigned to the device.

In an embodiment, at 344, the OS initiates particular microservices associated with backup, failover support, replication, and recovery for the self-contained microservice platform.

At 350, the self-contained processing environment provides the microservices over the network from the device utilizing the IP address and the DNS.

According to an embodiment, at 360, the self-contained processing environment performs operations within the self-contained microservice platform over the network for transactions being processed at transaction terminals and reported from the transaction terminals to the IP address assigned to the device. In an embodiment, the transaction terminals include: SSTs, POS terminals, ATMs, and/or kiosks.

In an embodiment of 360 and at 361, the self-contained processing environment performs other operation within the self-contained microservice platform over the network through the microservices that include: messages, notifications, reports, data management, product inventories, product catalogs, customer loyalty, promotions, device-based events (including user-operated devices, such as desktops, laptops, tablets, phones, and wearable processing devices), and transaction-based events from the transaction terminals).

Figure 6:
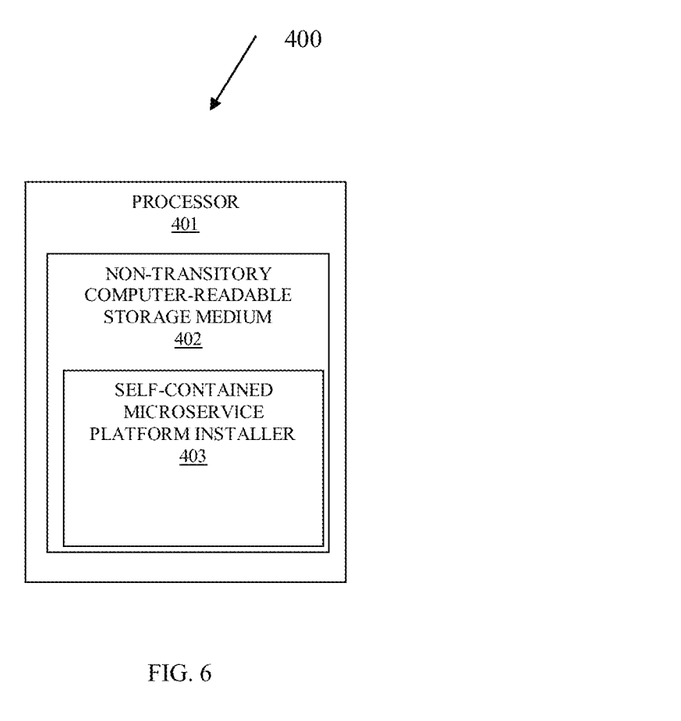
FIG. 6 is a diagram of a device configured as a customized and self-contained microservice platform, according to an example embodiment.

FIG. 6 is a diagram of a server 400 for configuring and installing a customized and self-contained processing environment, according to an example embodiment. The server 400 includes a variety of hardware components and software components. The software components of the server 400 are programmed and reside within memory and/or a non-transitory computer-readable medium and execute on one or more processors of the server 400. The server 400 communicates over one or more networks, which can be wired, wireless, or a combination of wired and wireless.

In an embodiment, the server 400 implements, inter alia, the processing described above with the FIGS. 1-5.

The server 400 includes a processor 401, a non-transitory computer-readable storage medium 402 having executable instructions representing a self-contained microservice platform installer 403.

The self-contained microservice platform installer 403 when executed from the non-transitory computer-readable storage medium 402 by the processor 401 is configured to cause the processor 401 to: 1) perform a boot strap operation upon detection of the server 400 being connected to a network to obtained an IP address for the server 400 and a DNS used on the network; 2) load and initiate from an installation package an operating system on the server 400; 3) load and initiate device drivers for types of device that communicate with the server over the network based on the installation package; 4) load and initiate microservices within the operating system based on the installation package; 5) load and initiate a portal interface for access to the microservices over the network at the IP address; and 6) provide the microservices to transaction devices and user-operated devices through the device drivers and the portal interface as a self-contained microservice platform for the network.

In an embodiment, the self-contained microservice platform installer 403 when executed from the non-transitory computer-readable storage medium 402 by the processor 401 is further configured to cause the processor 401 to: provide the self-contained microservice platform as a VM or a container processed on the server 400.

In an embodiment, the self-contained microservice platform installer 403 when executed from the non-transitory computer-readable storage medium 402 by the processor 401 is further configured to cause the processor 401 to: process at least one additional installation package providing a second self-contained microservice platform as a second VM or a second container processed on the server 400.

In an embodiment, the services are any of the microservices 120-170 discussed above with the FIGS. 1-6.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting a device connection to a target server, wherein the device is a blade device that was inserted into a blade port of the target server;
   processing a bootstrap operation on the device to obtain an Internet Protocol (IP) address for the device and a Domain Name System (DNS) used by the target server based on parameterized configuration settings that are dynamically populated with the IP address and a DNS name that the device is accessible over within the DNS of the target server;
   loading and initiating an operating system on the device;
   initiating, by the operating system, a self-contained microservice platform having a plurality of microservices from an installation package on the device;
   providing the microservices over a network from the device utilizing the IP address and the DNS;
   performing operations within the self-contained microservice platform over the network through the microservices for transactions being processed at transaction terminals and reported from the transaction terminals to the IP address, wherein performing further include performing other operations within the self-contained microservice platform over the network through the microservices that include processing directed to: messages, notifications, reports, data management, product inventories, product catalogs, customer loyalty, promotions, device-based events, and transaction-based events; and
   encapsulating the operations of the self-contained microservice platform on the blade device.

2. The method of claim 1, wherein processing further includes receiving the IP address and the DNS from the target server when the device is connected to the target server.

3. The method of claim 1, wherein initiating further includes loading and initiating, by the operating system, device drivers for types of network devices identified in the installation package.

4. The method of claim 1, wherein initiating further includes initiating, by the operating system, a portal interface accessible over the network at the IP address.

5. The method of claim 1, wherein initiating further includes initiating, by the operating system, Application Programming Interfaces (APIs) to monitor device-based interactions over the network directed to the IP address.

6. The method of claim 1, wherein initiating further includes, initiating, by the operating system, particular microservices associated with backup, failover support, replication, and recover for the self-contained microservice platform over the network.

7. A server, comprising:
   a processor;
   a non-transitory computer-readable storage medium having executable instructions representing a self-contained microservice platform installer; and the self-contained microservice platform installer that when executed by the processor from the non-transitory computer-readable storage medium cause the processor to:
  perform a boot strap operation upon detection of the server being connected to a network to obtain an Internet Protocol (IP) address for the server and a Domain Name System (DNS) used on the network based on parameterized configuration settings that are dynamically populated with the IP address and a DNS name that the server is accessible over within the DNS of the network, wherein the server is a blade device that is inserted into a blade server to force the boot strap operation of the blade device with the blade server;
  load and initiate from an installation package an operating system on the server;
  load and initiate device drivers for types of device that communicate with the server over the network based on the installation package;
  load and initiate microservices within the operating system based on the installation package;
  load and initiate a portal interface for access to the microservices over the network at the IP address;
  provide the microservices to transaction devices and user-operated devices through the device drivers and the portal interface as a self-contained microservice platform for the network;
  perform operations within the self-contained microservice platform over the network through the microservices for transactions being processed at transaction terminals and reported from the transaction terminals to the IP address, wherein performing further include performing other operations within the self-contained microservice platform over the network through the microservices that include processing directed to: messages, notifications, reports, data management, product inventories, product catalogs, customer loyalty, promotions, device-based events, and transaction-based events; and
  encapsulating the operations of the self-contained microservice platform on the blade device.

8. The server of claim 7, wherein the self-contained microservice platform installer is further configured to cause the processor to: provide the self-contained microservice platform as a Virtual Machine (VM) or a container processed on the server.

* * * * *